(12) United States Patent
Morrow et al.

(10) Patent No.: US 8,560,201 B2
(45) Date of Patent: Oct. 15, 2013

(54) GEN-SET CONTROL SYSTEM HAVING PROACTIVE LOAD RELIEF

(75) Inventors: David John Morrow, Ballymena (GB); Keith David Robert Chambers, Dungannon (GB); David John McGowan, Lisburn (GB); Peter Thomas Alexander Gordon, Ballclare (GB); Paresh Rameschchandra Desai, Peterborough (GB); Stephen Francis Hill, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 714 days.

(21) Appl. No.: 12/601,499

(22) PCT Filed: May 31, 2007

(86) PCT No.: PCT/US2007/012804
§ 371 (c)(1),
(2), (4) Date: Jun. 7, 2010

(87) PCT Pub. No.: WO2008/150256
PCT Pub. Date: Dec. 11, 2008

(65) Prior Publication Data
US 2010/0241283 A1    Sep. 23, 2010

(51) Int. Cl.
*G06F 19/00* (2011.01)
*F02D 29/06* (2006.01)
*H02H 7/06* (2006.01)

(52) U.S. Cl.
USPC ............... 701/99; 290/40 B; 322/28; 322/17

(58) Field of Classification Search
USPC ........... 701/99; 290/40 B, 40 F, 40 R, 31, 24; 322/17, 44, 89, 28, 90, 29; 318/139; 60/668; 180/65.4
See application file for complete search history.

(56) References Cited

U.S. PATENT DOCUMENTS

| 3,628,330 A | 12/1971 | Miller |
| 4,080,850 A | 3/1978 | Bubula et al. |

(Continued)

FOREIGN PATENT DOCUMENTS

| JP | 61-169629 | 7/1986 |
| JP | 1110884 | 4/1989 |

(Continued)

OTHER PUBLICATIONS

"New Allison Transmissions in Terex Trucks," Terex Today, the Magazine for Terex Customers Around the World (undated).

(Continued)

*Primary Examiner* — Muhammad Shafi
(74) *Attorney, Agent, or Firm* — Finnegan, Henderson, Farabow, Garrett & Dunner LLP

(57) ABSTRACT

A Gen-Set (10) control system is disclosed. The control system has an engine (12) having a desired operating range and a generator (14) driven by the engine to produce an electrical power output. The control system also has an engine control module (30) communicatively coupled with the engine, and configured to change and operating parameter of the engine based on a load command before a load on the engine causes the engine to deviate from the desired operating range. The control system further has an automatic voltage regulator (32). The automatic voltage regulator is configured to monitor at least one of a voltage output, a current output, and a power factor of the generator and generate the load command based on a change in at least one of the voltage output, the current output, and the power factor. The automatic voltage regulator (32) is also configured to deliver the load command to the engine control module (30).

5 Claims, 4 Drawing Sheets

(56) References Cited

U.S. PATENT DOCUMENTS

| | | |
|---|---|---|
| 4,191,270 A | 3/1980 | Monteith |
| 4,263,997 A | 4/1981 | Poore |
| 4,474,104 A | 10/1984 | Creffield |
| 4,523,892 A | 6/1985 | Mitchell et al. |
| 4,534,707 A | 8/1985 | Mitchell |
| 4,542,802 A | 9/1985 | Garvey et al. |
| 4,745,901 A | 5/1988 | Reifenberger et al. |
| 5,070,695 A | 12/1991 | Metzner |
| 5,184,466 A | 2/1993 | Schniederjan et al. |
| 5,257,193 A | 10/1993 | Kusaka et al. |
| 5,341,311 A | 8/1994 | Liebler |
| 5,406,483 A | 4/1995 | Kallis et al. |
| 5,435,131 A | 7/1995 | Hausman et al. |
| 5,468,126 A | 11/1995 | Lukich |
| 5,525,043 A | 6/1996 | Lukich |
| 5,868,214 A | 2/1999 | Workman |
| 6,267,707 B1 | 7/2001 | Bock |
| 6,308,124 B1 | 10/2001 | Kresse et al. |
| 6,308,516 B1 | 10/2001 | Kamada |
| 6,314,727 B1 | 11/2001 | Prabhu et al. |
| 6,335,573 B1 | 1/2002 | Eguchi et al. |
| 6,347,680 B1 | 2/2002 | Mianzo et al. |
| 6,351,692 B1 | 2/2002 | Eaton et al. |
| 6,385,970 B1 | 5/2002 | Kuras et al. |
| 6,424,902 B1 | 7/2002 | Kuras |
| 6,427,110 B1 | 7/2002 | Manken et al. |
| 6,436,005 B1 | 8/2002 | Bellinger |
| 6,440,038 B1 | 8/2002 | Holloway |
| 6,459,979 B2 | 10/2002 | Murakami |
| 6,555,929 B1 * | 4/2003 | Eaton et al. ................. 290/40 B |
| 6,574,541 B2 | 6/2003 | Katakura et al. |
| 6,574,543 B2 | 6/2003 | Ikeda |
| 6,672,055 B1 | 1/2004 | Konishi et al. |
| 6,684,145 B1 | 1/2004 | Gianoglio et al. |
| 6,685,597 B2 | 2/2004 | Satou et al. |
| 6,710,467 B2 | 3/2004 | Braun et al. |
| 6,762,592 B2 | 7/2004 | Noguchi et al. |
| 6,901,324 B2 | 5/2005 | Rose et al. |
| 7,146,263 B2 | 12/2006 | Guven et al. |
| 2001/0004619 A1 | 6/2001 | Schleicher et al. |
| 2002/0123836 A1 | 9/2002 | Komiyama et al. |
| 2003/0144784 A1 | 7/2003 | Tashiro et al. |
| 2004/0128047 A1 | 7/2004 | Graves et al. |
| 2004/0169421 A1 | 9/2004 | Eaton et al. |
| 2006/0132103 A1 * | 6/2006 | Baratto et al. .................. 322/17 |

FOREIGN PATENT DOCUMENTS

| | | |
|---|---|---|
| JP | 04-181063 | 6/1992 |
| JP | 04-203672 | 7/1992 |
| JP | 06-050424 | 2/1994 |
| WO | WO-2007/127370 | 11/2007 |
| WO | WO-2008/150256 | 11/2008 |

OTHER PUBLICATIONS

Finck, "Tractor Time," Farm Journal, pp. 36-38, Sep. 2001.

International Search Report for PCT/US07/12803 mailed Dec. 20, 2007.

International Search Report for PCT/US07/12804 mailed Sep. 24, 2008.

U.S. Appl. No. 12/601,503 (PCT/US07/12803) which was filed on Nov. 23, 2009.

* cited by examiner

GEN-SET CONTROL SYSTEM HAVING PROACTIVE LOAD RELIEF

TECHNICAL FIELD

The present disclosure relates generally to a gen-set control system and, more particularly, to a gen-set control system having proactive load relief.

BACKGROUND

Generator sets (referred to hereinafter as "gen-sets") are used in a variety of mobile and stationary applications to provide electrical power to, for example, worksites where utility power is unavailable (e.g. remote mining operations), and electrical devices during temporary power outages, portable operations, or power-charging. Gen-sets typically include a power source such as, for example, a diesel engine and a generator (e.g. an alternator) driven by the power source to produce electrical power. Gen-sets can be rated for different operating parameters such as, for example, different power types (i.e. AC power or DC power), output frequencies, output power levels, voltage, and/or current ranges, etc. The rated operating parameters of a particular gen-set generally correspond to relatively stable operations of the gen-set, and the operation of various components of the gen-set can be manipulated to control the current state of these operating parameters. For example, the field current of the alternator is typically positively correlated to the amount of complex power (i.e. real power and reactive power) produced by the generator. Further, in AC gen-sets, the speed of the engine is typically positively correlated to the frequency of the generated power.

One or more electrical devices are generally connected to draw power from the gen-set. As these devices are turned on, an electrical load is applied on the generator and is transferred to the engine in the form of a mechanical load. Because many components powered by alternating currents are rated for a particular frequency (e.g. 60 Hz in North America and 50 Hz in Europe), and can be damaged by fluctuations in the frequency of the provided power, it is desirable to keep the speed of the engine relatively constant. However, increases in electrical load on the generator may demand that the engine increase a torque output, and if these demands rise to a high level and/or occur within a relatively short time span, the engine may be caused to lug or stall. That is, the amount of power required from the engine to drive the generator, as demanded by the electrical load, may exceed an immediate output capability or a total output capability of the engine, thereby causing excessive engine speed droop. Stalling or lugging the engine may decrease the productivity and efficiency of the engine.

Further, regulatory and standards-setting agencies have placed restrictions on how much the actual frequency and voltage produced by a gen-set can depart from the expected output without causing damage to electrical devices rated for those expected voltages and frequencies. For example, a 10% frequency excursion from 60 Hz may be allowed, and a 20% voltage excursion from 120 V may be allowed. As a result, gen-sets must be carefully controlled to minimize fluctuations in the frequency of the generated power (i.e. maintain the speed of the engine within an acceptable range of frequencies), while generating voltages that fall within an acceptable range of voltages. Regulatory agencies are also placing increasing emphasis on reduced emissions from engines, including gen-set engines, which limit acceptable air-fuel ratios for these engines. Moreover, the number of electrically powered components in use today has increased, thus demanding a greater amount of power from an engine of a given size. These factors, among others, have complicated the control of gen-sets.

One way to control the operation of a gen-set is to include a control system within the gen-set. One example of a gen-set controller is disclosed in U.S. Pat. No. 6,555,929 ("the '929 patent") issued to Eaton et al. on Apr. 29, 2003. Specifically, the '929 patent discloses a gen-set controller that includes a method for preventing excessive reaction by a gen-set to a change in load. The gen-set controller is configured to communicate with a voltage regulator and any engine control modules (ECMs) included in an engine of the gen-set to control the output voltage and frequency of the gen-set. More specifically, the gen-set controller receives analog voltage and current outputs from the alternator, converts them to corresponding digital signals, and uses them to monitor the performance of the gen-set. The gen-set controller also uses these signals to calculate other gen-set operating parameters, such as output power, power factor, and alternator duty level and frequency, and provides command signals to the voltage regulator to control the voltage, current, and power output levels of the alternator. The gen-set controller further monitors information gathered by the ECM about the engine's operation, and provides control commands to the ECM to shutdown the engine, should a system fault occur. The gen-set controller monitors an output voltage and current of the gen-set during a first period of time and uses them to calculate a first average power output of the gen-set. Similarly, the gen-set controller monitors an output voltage and current of the gen-set during a second period of time and uses them to calculate a second average power output of the gen-set. The gen-set controller then compares the first and second average power outputs to determine whether they differ by at least a predetermined amount. If the first and second average power outputs differ by at least the predetermined amount, the gen-set controller provides a control signal to cause a position of a throttle of the gen-set to change.

Although the gen-set controller of the '929 patent may adequately control operation of a gen-set to respond to relatively quick and/or large increases in load, its efficiency may be limited. Because the gen-set controller may not provide a control signal until after monitoring the power output of the gen-set for two periods of time, the response time of the engine to changing load demands may suffer and may even cause the engine to stall. For example, because incoming load increases may not be anticipated by the gen-set controller of the '929 patent until after two periods of time, the controller must adapt the gen-set to a drastic load change after the fact, thus creating a delay (i.e. temporary power shortage) in the output of the gen-set. Further, because the gen-set controller does not include a strategy for handling a load spike, it may drive the engine and alternator to suddenly produce a maximum power output during an overload period, thus risking engine stalling or lugging.

The present disclosure is aimed at overcoming some or all of the disadvantages associated with the prior art.

SUMMARY OF THE INVENTION

One aspect of the present disclosure is directed to a control system. The control system includes an engine having a desired operating range, and a generator driven by the engine to produce an electrical power output. The control system also includes an engine control module communicatively coupled with the engine, and configured to change an operating parameter of the engine based on a load command before a load on the engine causes the engine to deviate from the desired operating range. The control system further includes an automatic voltage regulator communicatively coupled with the generator and the engine control module. The automatic voltage regulator is configured to monitor at least one of a voltage output, a current output, and a power factor of the generator and generate the load command based on a change in at least one of the voltage output, the current output, and the power factor. The automatic voltage regulator is also configured to deliver the load command to the engine control module.

Another aspect of the present disclosure is directed to a control system. The control system includes an engine having a desired operating range, and a generator driven by the engine to produce an electrical power output. The control system also includes an engine control module communicatively coupled with the engine. The engine control module is configured to monitor an operating parameter of the engine, and request load relief before a load on the engine causes the engine to deviate from the desired operating range when it is determined that the load on the engine will cause the operating parameter to deviate from a predetermined range. The control system further includes an automatic voltage regulator communicatively coupled with the generator and the engine control module.

A further aspect of the present disclosure is directed to a method. The method includes monitoring at least one of a voltage output and a current output of a generator set having an engine and a generator, and determining a power factor of the generator set based on at least one of the voltage output and the current output. The method also includes determining a desired change in an operating parameter of the engine based on the power factor. The method further includes controlling the operating parameter of the engine based on the desired change.

DETAILED DESCRIPTION

Figure 1:
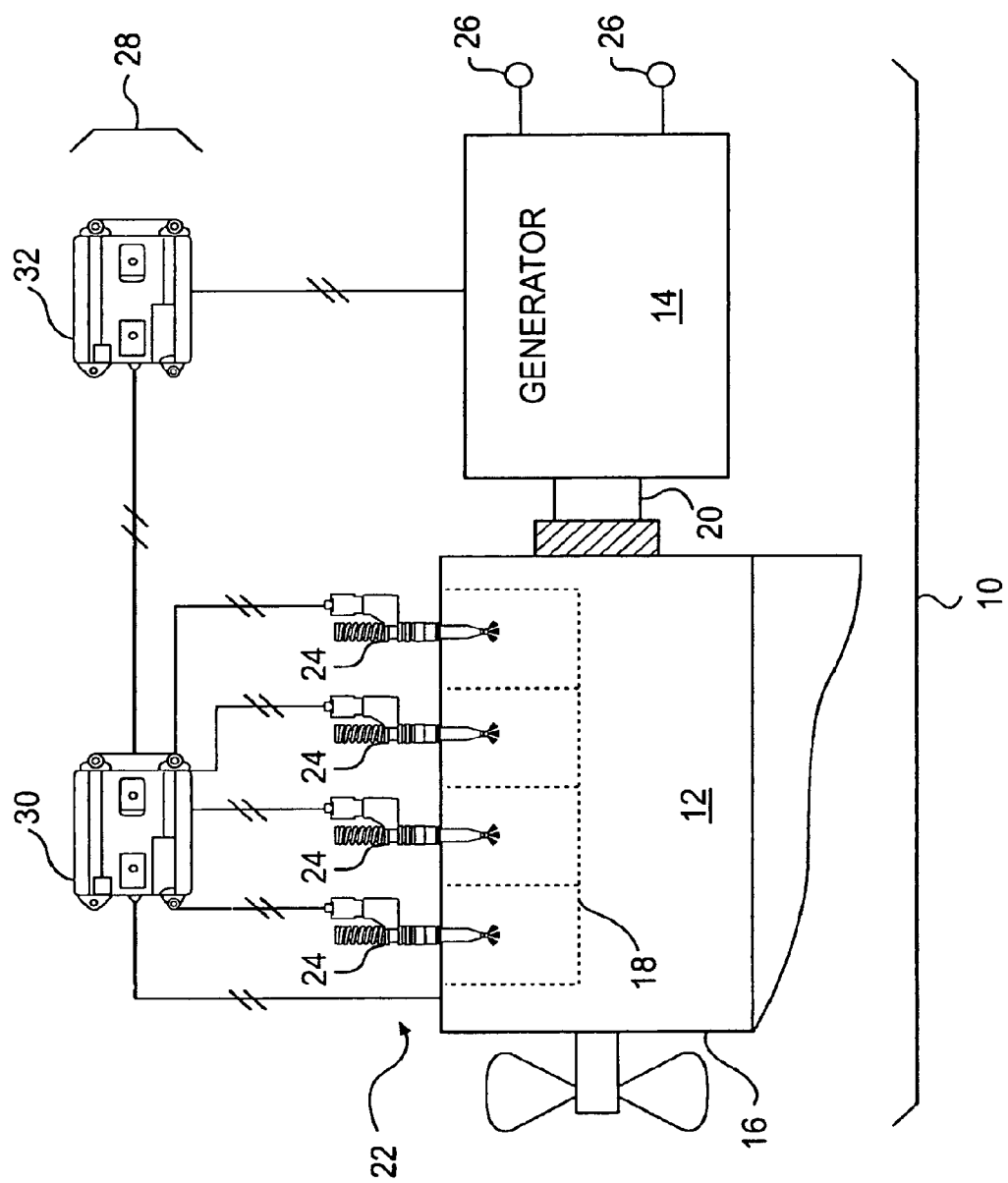
FIG. 1 is a diagrammatic illustration of an exemplary disclosed gen-set.

FIG. 1 illustrates a generator set 10 (referred to hereinafter as "gen-set 10") including an engine 12 and a generator 14. Gen-set 10 may generally provide electrical power to any number of electrically-powered devices. For example, gen-set 10 may provide electrical power to worksites where utility power is unavailable (e.g. mining operations), and to electrical devices during temporary power outages, portable operations, or power-charging. It is contemplated that gen-set 10 may provide AC power or DC power, depending on a type of generator 14.

Engine 12 may generally produce a mechanical power output. For the purposes of this disclosure, engine 12 is depicted and described as a four-stroke diesel engine. One skilled in the art, however, will recognize that engine 12 may alternatively embody any other type of internal combustion engine such as, for example, a gasoline engine or a gaseous fuel-powered engine. It should be appreciated that engine 12 may be replaced by a non-engine type of mechanical power-producing device without departing from the scope of the present disclosure.

Engine 12 may combust a mixture of air and fuel to generate mechanical power and exhaust. As such, engine 12 may include an engine block 16 that at least partially defines a plurality of combustion chambers 18, and a crankshaft 20 rotatably disposed within engine block 16. In the illustrated embodiment, engine 12 includes four combustion chambers 18. However, it is contemplated that engine 12 may include a greater or lesser number of combustion chambers 18 and that combustion chambers 18 may be disposed in an "in-line" configuration, a "V" configuration, or any other suitable configuration. Each combustion chamber 18 may house a piston (not shown) connected to crankshaft 20 such that a sliding motion of each piston within its respective combustion chamber 18 results in a rotation of crankshaft 20. Similarly, a rotation of crankshaft 20 may result in a sliding motion of the pistons. It is contemplated that engine 12 may additionally or alternatively include any number of other components such as, for example, an air intake system and an exhaust system. It is also contemplated that engine 12 may provide any number of electrical feedback signals indicative of a current state of engine 12. For example, engine 12 may provide signals indicative of engine temperature, engine speed, fuel injection timing, fuel pressure, air temperature, air pressure, and/or air-fuel ratio.

Engine 12 may compress and combust a mixture of fuel and air to produce a mechanical power output having a torque and a speed (i.e. engine speed), as is known in the art. As such, each combustion chamber 18 may receive fuel and air, and house the combustion of the fuel and air. The fuel may be provided to each combustion chamber by a fuel system 22 including a plurality of fuel injectors 24. Each fuel injector 24 may be disposed within a respective one of combustion chambers 18 to inject an amount of pressurized fuel into the respective combustion chamber 18 at predetermined timings, pressures, and quantities. Each fuel injector 24 may embody any type of electronically controlled fuel injection device such as, for example, an electronically actuated-electronically controlled injector, a mechanically actuated-electronically controlled injector, a digitally controlled fuel valve associated with a high pressure common rail, or any other type of fuel injector known in the art. It is contemplated that some or all operating parameters of fuel injectors 24 may be electronically controlled. For example, the timings, pressures, quantities, and/or velocities of the injections may be electronically controlled. It should be appreciated that other non-fueling operating parameters of engine 12 may also be electronically controlled, such as, for example, a quantity or pressure of air delivered to engine 12.

Engine 12 may have a desired operating range. For the purposes of this disclosure, the term "desired operating range" includes those speeds and torques at which engine 12 experiences substantially stable and efficient operation and/or operates within the requirements of statutory regulations. When operating outside the desired operating range, engine 12 may experience unstable operation such as, for example, overspeed situations, underspeed situations, lugging, and/or stalling. Efficiency losses may also be experienced by engine 12 when operating outside the desired operating range, such as, for example, increased fuel consumption, increased exhaust emissions, increased power source temperatures, and/or decreased responsiveness. The desired operating range may be associated with any number of rated operating parameters. That is, some or all operating parameters of engine 12 may be associated with predetermined ranges during which operating of engine 12 may be stable, efficient, and/or in conformance with statutory regulations. For example, engine 12 may be rated to operate stably up to a maximum engine speed threshold. In another example, the air-fuel ratio of engine 12 may be associated with a maximum threshold below which exhaust emissions may conform to statutory emissions regulations.

Operation of engine 12 may serve to mechanically drive generator 14. More specifically, crankshaft 20 may be mechanically coupled to generator 14 such that a rotation of crankshaft 20 may drive a rotation of one or more components of generator 14. Generator 14 may be mechanically-driven to provide an electrical power output. For example, generator 14 may embody a DC generator or an AC generator. It should be appreciated that generator 14 may embody any type of generator known in the art. For the purposes of this disclosure, generator 14 is described as a three-phase AC synchronous alternator. That is, generator 14 may include a rotor (not shown) that rotates relative to a stator (not shown). The rotor may include a set of electrical field coils that may be energized by a field current delivered to the field coils by any means known in the art. The rotor may be driven to rotate by the rotation of crankshaft 20. The stator of generator 14 may include a set of stationary coils positioned about the rotor such that the rotor may rotate within the stator. As the rotor rotates, an AC current may be induced in the stationary coils. This current may be directed out of generator 14 by a set of output terminals 26 in the form of an AC power signal. One skilled in the art will recognize that an output voltage of generator 14 may be controlled by a magnitude of the field current applied to the field coils. It should be appreciated that generator 14 may be rated to provide power within an allowable excursion from a nominal voltage, such as, for example, a 20% deviation from the nominal voltage. For example, electrical devices connected to draw power from generator 14 may require 500 V from generator 14. During operation of generator 14, the voltage provided by generator 14 may be allowed to experience excursions between 400 V and 600 V without deviating from its rated allowable range.

In an exemplary operation of generator 14, an electrical load may be powered by the AC power signal generated by generator 14. That is, generator 14 may be connected to deliver AC power to one or more electrical devices rated for power at a target frequency and a target voltage. It should be appreciated that these electrical devices may be rated for operation within an allowable excursion from the target frequency, such as, for example, a 10% deviation from the target frequency. As the electrical devices are turned on and/or off, the electrical load applied to generator 14 may change in magnitude. This electrical load may be transferred to engine 12 in the form of a mechanical load applied by the movement of the rotor. As the electrical load changes, electromagnetic resistance within generator 14 may cause the mechanical load placed on engine 12 to change correspondingly, thus requiring that a torque of the mechanical power output of engine 12 be changed to maintain the speed of engine 12 (i.e. to keep the frequency of the AC power output of generator 14 within the allowable excursion from the target frequency).

In order to provide efficient operation under changing electrical loads, generator set 10 may be at least partially controlled by a control system 28. Control system 28 may include an engine control module 30 communicatively coupled with engine 12, and an automatic voltage regulator 32 communicatively coupled with generator 14 and engine control module 30. It is contemplated that engine control module 30 and automatic voltage regulator 32 may alternatively embody a single control unit, or that control system 28 may include any number of additional control units such as, for example, one or more supplemental control units to coordinate communication between engine control module 30 and automatic voltage regulator 32. It should be appreciated that control system 28 may additionally include any number of other components such as, for example, an operator user interface allowing an operator of gen-set 10 to input desired operating parameters of gen-set 10.

Figure 2:
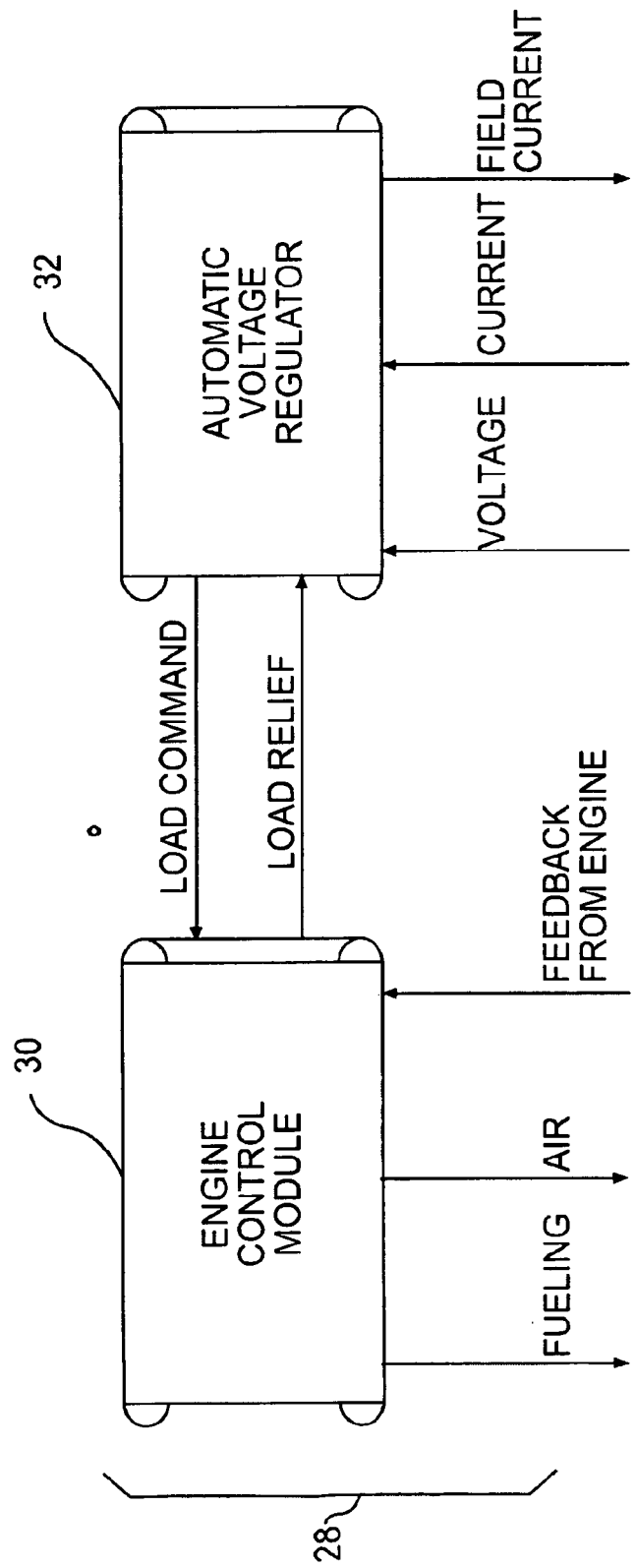
FIG. 2 is a diagrammatic illustration of a control system for use with the gen-set of FIG. 1.

Engine control module 30 and automatic voltage regulator 32 may each accept any number of input signals and generate any number of output signals. For example, as illustrated in FIG. 2, engine control module 30 may generally process input signals received from engine 12 and automatic voltage regulator 32, generate output signals based on the received input signals, and deliver the output signals to engine 12 and/or automatic voltage regulator 32, as appropriate. As such, engine control module 30 may embody a single microprocessor or multiple microprocessors that include a means for processing the signals generated by engine 12 and automatic voltage regulator 32. For example, engine control module 30 may include a memory, a secondary storage device, and a processor, such as a central processing unit or any other means for processing the input signals. Numerous commercially available microprocessors, microcontrollers, digital signal processors (DSPs), and other similar devices including field programmable gate arrays (FPGAs) programmed to act as a processor can be configured to perform the functions of engine control module 30. In one example, engine control module 30 may embody a hybrid fuzzy proportional-integral-derivative (PID) controller. It should be appreciated that engine control module 30 may include one or more of an application-specific integrated circuit (ASIC), an FPGA, a computer system, and a logic circuit, configured to allow engine control module 30 to function in accordance with the present disclosure. Thus, the memory of engine control module 30 may embody, for example, the flash memory of an ASIC, flip-flops in an FPGA, the random access memory of a computer system, or a memory circuit contained in a logic circuit. Engine control module 30 may further be communicatively coupled with an external computer system, instead of or in addition to including a computer system.

Engine control module 30 may receive feedback signals from engine 12 such as, for example, engine temperature, engine speed, fuel injection timing, fuel injection quantity, fuel pressure, air temperature, air pressure, and/or air-fuel ratio. Engine control module 30 may be operable to use these feedback signals to monitor operation of engine 12. Engine control module 30 may also be configured to control operation of engine 12 by generating control commands such as, for example, fueling commands and/or air intake commands. In one example, engine control module 30 may deliver commands to fuel injectors 24 to set at least one of the timing, pressure, and quantity of fuel injected into combustion chambers 18. In another example, engine control module 30 may deliver commands to the air intake system of engine 12 to set at least one of the temperature, pressure, and quantity of air delivered to combustion chambers 18. In this manner, engine control module 30 may control the speed and/or torque of engine 12. It is contemplated that engine control module 30 may generate any other type of control commands to control the operation of engine 12. It should be appreciated that engine control module 30 may control engine 12 such that its operation falls within the desired operating range of engine 12. That is, engine control module 30 may include, stored in its memory, any number of thresholds and/or ranges of acceptable values for the operational parameters of engine 12, and may monitor these parameters to ensure that they fall within their respective acceptable values.

As the mechanical load applied to engine 12 changes, engine control module 30 may generate control commands to change the torque output of engine 12 while maintaining engine speed, as discussed above. It should be appreciated, however, that if the mechanical load increases beyond a predetermined threshold (i.e. the electrical load on generator 14 increases beyond a predetermined threshold), engine control module 12 may determine that changing operation of engine 12 to accommodate the mechanical load may cause one or more of the operational parameters of engine 12 to deviate from a range of acceptable values. For example, the mechanical load on engine 12 may increase such that a corresponding increase in the quantity of fuel injected into combustion chambers 18 may cause the air-fuel ratio to deviate from a threshold required by exhaust emission regulations. When this occurs, engine control module 30 may generate a request for load relief to decrease an amount of the mechanical load on engine 12. It should be appreciated that the request for load relief may embody a voltage or current signal with a magnitude proportional to an amount of relief requested by engine 12. Alternatively, the request may embody a digital data instruction. The request for load relief may be delivered to automatic voltage regulator 32, as will be described in further detail below.

Engine control module 30 may also include, stored in its memory, an algorithm to control operation of engine 12 based on an indication of an electrical load demanded from gen-set 10 (i.e. a load command). It should be appreciated that the load command may be delivered to engine control module 30 before a change in the mechanical load applied to engine 12 may cause a speed of engine 12 to deviate from a predetermined range. The algorithm stored in the memory of engine control module 30 may be any type of algorithm implemented on any combination of hardware and software, such as, for example, a fuzzy logic algorithm or a hybrid fuzzy logic algorithm. More specifically, engine control module 30 may receive the load command, and associate the load command with at least one membership function (e.g. high load command or medium load command). Engine control module 30 may then apply a plurality of rules to the associated membership functions (e.g. if the load command is a high load command, then increase the quantity of fuel delivered to combustion chambers 18). Engine control module 30 may then determine a plurality of results from the rules (e.g. the quantity of fuel delivered to combustion chambers 18 should be increased), and use these results to determine desired values of one or more operating parameters of engine 12 (e.g. inject 2 mL of fuel into each combustion chamber 18). Engine control module 30 may then generate control commands indicative of the desired values, and deliver the control commands to modify operation of engine 12. It should be appreciated that the algorithm may further ensure that the operation of engine 12 is maintained within rated limits (e.g. engine speed is not increased so as to increase the frequency of AC output of generator 14 above the acceptable deviation from the target frequency). It is contemplated that the algorithm may also generate a request for load relief if the desired values would cause engine 12 to operate outside of its rated limits.

Automatic voltage regulator 32 may generally process input signals received from generator 14 and engine control module 30, generate output signals based on the input signals, and deliver the output signals to generator 14 and/or engine control module 30, as appropriate. As such, automatic voltage regulator 32 may embody a single microprocessor or multiple microprocessors that include a means for processing the signals generated by generator 14 and engine control module 30. For example, automatic voltage regulator 32 may include a memory, a secondary storage device, and a processor, such as a central processing unit or any other means for processing the input signals. Numerous commercially available microprocessors, microcontrollers, digital signal processors (DSPs), and other similar devices including field programmable gate arrays (FPGAs) programmed to act as a processor can be configured to perform the functions of automatic voltage regulator 32. In one example, automatic voltage regulator 32 may embody a hybrid fuzzy proportional-integral-derivative (PID) controller. It should be appreciated that automatic voltage regulator 32 may include one or more of an application-specific integrated circuit (ASIC), an FPGA, a computer system, and a logic circuit, configured to allow automatic voltage regulator 32 to function in accordance with the present disclosure. Thus, the memory of automatic voltage regulator 32 may embody, for example, the flash memory of an ASIC, flip-flops in an FPGA, the random access memory of a computer system, or a memory circuit contained in a logic circuit. Automatic voltage regulator 32 may be further communicatively coupled with an external computer system, instead of or in addition to including a computer system.

Automatic voltage regulator 32 may receive signals from generator 14 such as, for example, an AC voltage and an AC current outputted by generator 14. Automatic voltage regulator 32 may use these signals from generator 14 to monitor operation of generator 14. More specifically, automatic voltage regulator 32 may include, stored in its memory, one or more formulas to convert the AC voltage and/or AC current outputted by generator 14 to one or more respective parameters indicative of a current operating state of generator 14. For example, automatic voltage regulator may use the AC voltage and AC current to calculate a power factor of generator 14. As is known in the art, the power factor of generator 14 may be a unitless representation of an efficiency of power transfer from generator 14 to the electrical load drawing power therefrom. For example, the power factor of generator 14 may be calculated as a ratio of a real power generated by generator 14 (i.e. a real component of a complex power generated by generator 14) to an apparent power generated by generator 14 (i.e. a modulus of the complex power generated by generator 14 or a product of the AC voltage and the AC current outputted by generator 14), wherein both the apparent power and the real power may be determined from the AC voltage and AC current output from by generator 14, as is known in the art. That is, automatic voltage regulator 32 may monitor the power factor of generator 14 by monitoring the AC voltage and AC current output from generator 14, and calculating the power factor therefrom. It is contemplated that automatic voltage regulator 32 may additionally monitor other parameters indicative of the current operating state of generator 14, such as, for example, a frequency of the AC voltage and/or AC current outputted by generator 14.

Automatic voltage regulator 32 may also control operation of generator 14 by supplying the field current to generator 14. More specifically, automatic voltage regulator 32 may control the field current of generator 14 in order to set the output voltage of generator 14. It is contemplated that automatic voltage regulator 32 may generate any other type of command to control the operation of generator 14. It should be appreciated that automatic voltage regulator 32 may control generator 14 such that its operation falls within rated operating states. That is, automatic voltage regulator 32 may include, stored in its memory, any number of thresholds and/or ranges of acceptable values for the operational parameters of generator 14, and may monitor these parameters to ensure that they fall within their respective acceptable values. For example, automatic voltage regulator 32 may ensure that the output voltage of generator 14 falls within 20% of the voltage demanded from generator 14.

As the electrical load applied to generator 14 changes, automatic voltage regulator 32 may monitor changes in the AC voltage output, AC current output, and power factor of generator 14, and generate a load command based on changes thereof. For example, if the power factor changes by more than a predetermined amount within a predetermined period of time, automatic voltage regulator 32 may generate a load command indicative of the new electrical load applied to generator 14, and deliver the load command to engine 12 in order to alert engine 12 of the incoming corresponding change in mechanical load. It should be appreciated that the load command may embody a voltage or current signal with a magnitude proportional to an amount of the electrical load applied to generator 14. Alternatively, the load command may embody a digital data instruction.

Automatic voltage regulator 32 may also include, stored in its memory, an algorithm to control operation of generator 14 to provide load relief to engine 12. The algorithm stored in the memory of automatic voltage regulator 32 may be any type of algorithm implemented on any combination of hardware and software, such as, for example, a fuzzy logic algorithm or a hybrid fuzzy logic algorithm. More specifically, automatic voltage regulator 32 may initiate a load relief operation based on a determination that a change in the electrical load applied to generator 14 may cause engine 12 to deviate from a desired operating range. That is, automatic voltage regulator 32 may alter one or more operating parameters of generator 14 (i.e. decrease the field current of generator 14), and wait for confirmation from engine control module 30 that load relief is requested (i.e. in the form of a request for load relief). Automatic voltage regulator 32 may receive the request for load relief, and associate the request with at least one membership function (e.g. high amount of load relief or medium amount of load relief). Automatic voltage regulator 32 may then apply a plurality of rules to the associated membership functions (e.g. if the request asks for a high amount of load relief, then decrease the field current supplied to generator 14). Automatic voltage regulator 32 may then determine a plurality of results from the rules (e.g. the field current supplied to generator 14 should be decreased), and use these results to determine desired values of one or more operating parameters of generator 14 (e.g. set the field current of generator 14 to 1.5 A).

Figure 3:
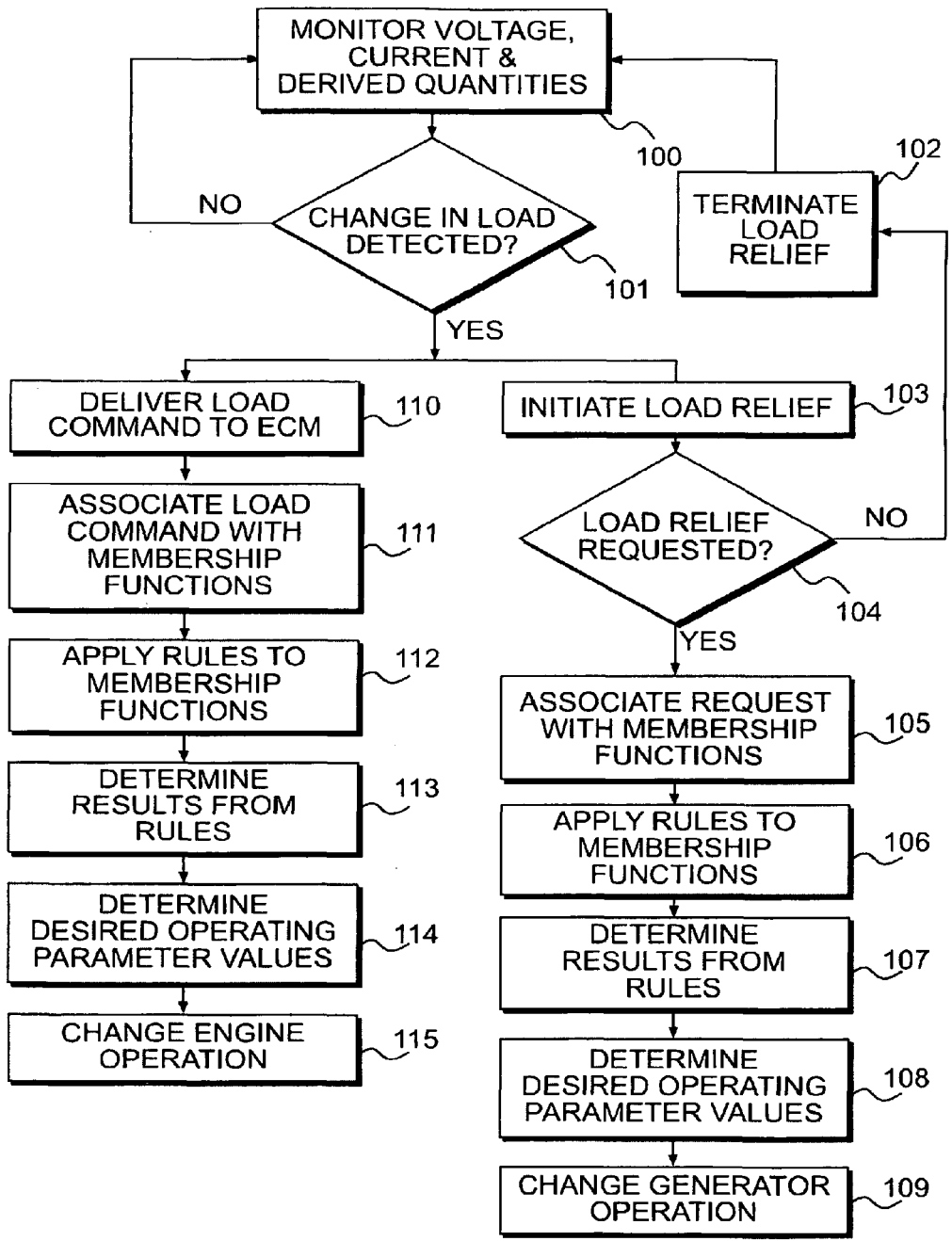
FIG. 3 is a flowchart depicting an exemplary disclosed operation of the control system of FIG. 2.
Figure 4:
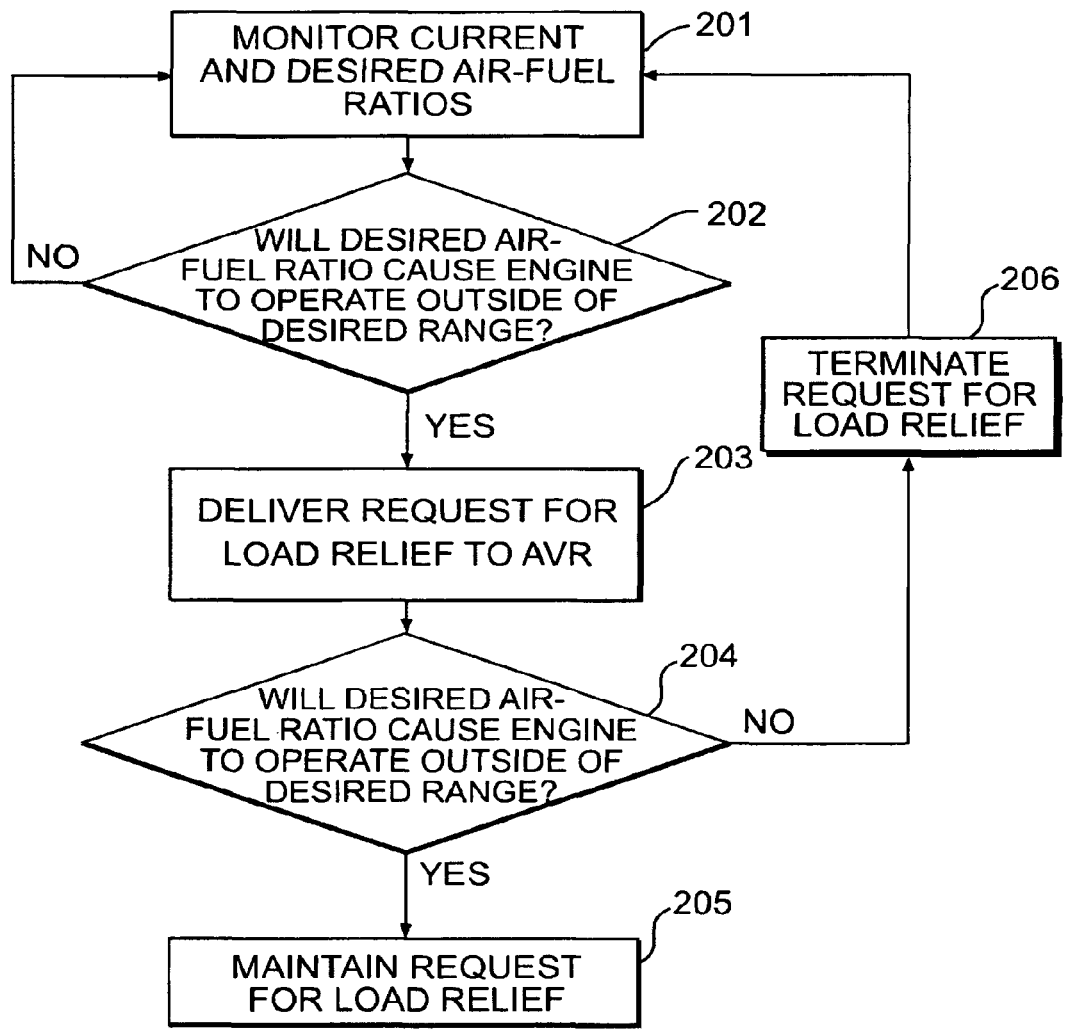
FIG. 4 is a flowchart depicting another exemplary disclosed operation of the control system of FIG. 2.

Flow charts illustrating exemplary methods of operating control system 28 are shown in FIGS. 3 and 4, respectively. The flowcharts will be discussed in the following section to further illustrate control system 28 and its operation.

INDUSTRIAL APPLICABILITY

In conventional systems, the time required to transfer a desired change in load from a generator to an engine may result in the engine experiencing undesirable operation such as, for example, deviation from one or more desired operating ranges. Further, the load demands placed on the engine may also cause the engine to experience undesirable operation. The system of the present disclosure, however, is configured to accommodate changes in load experienced by an engine while avoiding the undesirable operation. The disclosed system decreases the amount of time required to respond to a change in load placed on an engine and/or reduces the load change by preparing the engine in advance of the load transfer, determining an amount of load transfer that can be accommodated by the engine, and relieving the remaining amount of load change from the generator. In this manner, the system of the present disclosure operates in advance of the timing of a conventional system. The operation of generator set 10 will now be explained with reference to FIG. 1.

Engine 12 may combust a mixture of air and fuel within combustion chambers 18 to produce a mechanical output in the form of a rotation of crankshaft 20. The rotation of crankshaft 20 may have a speed and a torque determined at least in part by an amount of air and an amount of fuel present in combustion chambers 18 (i.e. an air-fuel ratio). The amount of fuel injected into combustion chambers 18 may be at least partially controlled by engine control module 30. Engine control module 30 may also at least partially control the timing, and/or pressure of the injected fuel. The rotation of crankshaft 20 may drive the rotor of generator 14 to rotate within the stator of generator 14. The field coils of the rotor may be excited by a field current applied thereto by automatic voltage regulator 32. Thus, as the rotor is driven to rotate, an AC current may be induced in the stationary coils of the stator, as is known in the art. This AC current may be directed to output terminals 26 to provide AC power to one or more electrical devices.

The frequency of the AC power may be proportional to the speed of crankshaft 20 (i.e. engine speed). As discussed above, the electrical devices connected to draw power from generator 14 may be rated to operate within a predetermined range of a target frequency. For example, in North America, the electrical devices may tolerate a 10% excursion from a frequency of 60 Hz. Thus, engine control module 30 may monitor the speed of engine 12 and/or the frequency of the power output of generator 14 to ensure that the engine speed maintains the frequency within this range. Further, the voltage of the AC power may be proportional to the field current supplied to the field coils of generator 14.

The electrical devices connected to output terminals 26 may apply an electrical load to generator 14. The electrical load may induce electromagnetic resistance on the rotation of the rotor. This resistance may be passed to the engine in the form of mechanical resistance on the rotation of crankshaft 20 (i.e. a mechanical load on engine 12). In order to maintain engine speed such that the output frequency of generator 14 remains within the acceptable range, the mechanical torque output of engine 12 may be increased in response to the increasing electrical load. For example, engine control module 30 may increase a fueling quantity in order to increase the mechanical torque output of engine 12. In some cases of changing electrical load, the change may be substantially large over a substantially short period of time (i.e. a load spike). In such cases, the mechanical load transferred to engine 12 may cause the mechanical power output of engine 12 to droop, leading engine 12 to stall or lug. In order to prevent this engine droop, automatic voltage regulator 32 and engine control module 30 may cooperate to increase the mechanical torque output before or simultaneously with the mechanical load transfer to engine 12. An exemplary description of this operation is provided with reference to FIG. 3.

Automatic voltage regulator 32 may monitor the AC voltage output, the AC current output, and one or more operating parameters derived therefrom (e.g. the power factor) of generator 14 during operation of gen-set 10 (Step 100). For example, automatic voltage regulator 32 may receive signals indicative of the output voltage and current of generator 14, and use these to compute the power factor, as discussed above. It should be appreciated that a load spike may result in a substantially instantaneous change in voltage, current, and/or the power factor. As such, automatic voltage regulator 32 may compare changes in the voltage, current, and/or power factor to one or more threshold values stored in its memory to determine whether a change in load has exceeded a predetermined amount in a predetermine period of time (e.g. load spike has occurred) (Step 101). Alternatively or additionally, automatic voltage regulator 32 may determine wither the change in load may cause operation of engine 12 to deviate from one or more desired operating ranges. If automatic voltage regulator 32 determines that such a change in load has not occurred, automatic voltage regulator 32 may continue to monitor the voltage, current, and/or power factor.

However, if automatic voltage regulator 32 determines that such a load change has occurred, automatic voltage regulator 32 may generate a load command and deliver the load command to engine control module 30 (Step 110). More specifically, automatic voltage regulator 32 may generate the load command to communicate a value proportional to the incoming change in electrical load. It is contemplated that the load command may alternatively communicate a value proportional to the determined change in electrical load, the incoming change in mechanical load that will be caused by the incoming electrical load, or a determined change in the mechanical load.

Engine control module 30 may receive the load command and apply the hybrid fuzzy logic algorithm discussed above to the load command to determine a desired operating parameter value (Steps 111-114). For example, the load command may indicate to engine control module 30 that the incoming change in mechanical load is about 500 hp. Engine control module 30 may associate the load command with a plurality of membership functions (i.e. fuzzification of the load command) (Step 111). For example, engine control module 30 may determine that the load command should be included in a high load membership function and in a medium load membership function. One skilled in the art will appreciate that the load command may be included in some proportion of the membership functions. For example, the load command may be 0.6 high and 0.4 medium.

Engine control module 30 may then apply rules to the membership functions in light of the load command's membership in those functions (Step 112). For example, engine control module 30 may apply a first rule such as "if load command is high, then increase fueling substantially" and a second rule such as "if load command is medium, then increase fueling moderately." It should be appreciated that any number of other rules may be applied based on each membership function, and that any number of other operational parameters may be included in the rules (e.g. fuel pressure, fuel injection timing, air pressure, air quantity, air temperature, engine speed, etc.). For example, another rule may be "if load command is high and engine speed is high, then keep fueling constant and increase air temperature." Engine control module 30 may determine results from the applied rules and the proportion of each membership function (Step 113). Each result may have an instruction corresponding to a respective rule, and a weight corresponding to a weight of the load command's inclusion within a respective membership function. Continuing the above example, engine control module 30 may determine that fueling should be increased substantially with a weight of 0.6, and that fueling should be increased slightly with a weight of 0.4.

Engine control module 30 may then determine one or more desired operating values based on the results of the rules (i.e. defuzzification of the results) (Step 114). Engine control module 30 may employ any defuzzification strategy known in the art, such as, for example, the "centroid" method, the "min-max inferencing" method, or the "height" method. For example, using the centroid method, engine control module 30 may determine a "center of mass" of 0.6 fuel increased and 0.4 fuel slightly increased, as is known in the art, to determine a discrete desired value of the quantity of fuel injected into combustion chambers 18. Engine control module 30 may then deliver this value to fuel injectors 24 (Step 115). The delivery of this value to fuel injectors 24 may occur prior to a deviation from desired operating ranges of engine 12 caused by the change in load, so as to reduce or avoid the deviation. It should be appreciated that engine control module 30 may additionally or alternatively deliver discrete desired values for any combination of the operating parameters of engine 12 in order to increase the mechanical torque output of engine 12 in accordance with the load command.

It is contemplated that as engine control module 30 controls the operation of engine 12 in response to applied mechanical loads or load commands, one or more of the determined desired values may cause engine 12 to deviate from the desired operating range. As such, engine control module 30 may cooperate with automatic voltage regulator 32 to relieve at least a portion of the mechanical load imposed upon engine 12. That is, automatic voltage regulator 32 may initiate a load relief operation by reducing the field current of generator 14 (Step 103). It should be appreciated that Step 103 may be completed before, after, or substantially simultaneously with Step 110 (i.e. delivery of the load command to engine control module 30). Automatic voltage regulator 32 may then wait a predetermined period of time to receive confirmation from engine control module 30 that load relief is requested (Step 104). If a request for load relief is not received within the predetermined period of time, automatic voltage regulator 32 may terminate the load relief operation by returning the field current to a nominal level (Step 102).

However, if engine control module 30 does deliver a request for load relief to automatic voltage regulator 32, automatic voltage regulator 32 may use the request to continue the load relief operation. More specifically, automatic voltage regulator 32 may receive the request for load relief and apply the hybrid fuzzy logic algorithm discussed above to the request to determine a desired operating parameter value (Steps 105-109). For example, the request may indicate to automatic voltage regulator 32 that the desired amount of electrical load relief may be attained by adjusting the output voltage by 20 V. Automatic voltage regulator 32 may associate the request with a plurality of membership functions (i.e. fuzzification of the request for load relief) (Step 105). For example, automatic voltage regulator 32 may determine that the request should be included in a medium load relief membership function and in a low load relief membership function. One skilled in the art will appreciate that the request may be included in some proportion of the membership functions. For example, the request may be 0.8 medium and 0.2 low.

Automatic voltage regulator 32 may then apply rules to the membership functions in light of the request's membership in those functions (Step 106). For example, automatic voltage regulator 32 may apply a first rule such as "if request is medium, then field current is decreased" and a second rule such as "if request is low, then field current is slightly decreased." It should be appreciated that any number of other rules may be applied based on each membership function, and that any number of other operational parameters may be included in the rules (e.g. output frequency, output voltage, etc.). For example, another rule may be "if request is medium and output voltage is high, then field current is greatly decreased." Automatic voltage regulator 32 may determine results from the applied rules and the proportion of each membership function (Step 107). Continuing the above example, automatic voltage regulator 32 may determine that fueling is 0.8 decreased and 0.2 slightly decreased.

Automatic voltage regulator 32 may then determine one or more desired operating values based on the results of the rules (i.e. defuzzification of the results) (Step 108). Automatic voltage regulator 32 may employ any defuzzification strategy known in the art, such as, for example, the "centroid" method, the "min-max inferencing" method, or the "height" method. For example, using the centroid method, automatic voltage regulator 32 may determine a "center of mass" of 0.8 field current decreased and 0.2 field current slightly decreased, as is known in the art, to determine a discrete desired value of the field current supplied to generator 14. Automatic voltage regulator 32 may then deliver the desired field current to generator 14 (Step 109). It should be appreciated that the desired field current may be delivered before excess mechanical load can be transferred to engine 12. It should also be appreciated that automatic voltage regulator 32 may additionally or alternatively deliver discrete desired values for any combination of the operating parameters of generator 14 in order to decrease the electrical load applied thereto in accordance with the request for load relief. It should further be appreciated that automatic voltage regulator 32 may verify that the desired field current does not cause the voltage output of generator 14 to deviate from the rated range. For example, if the electrical output of generator 14 is 200 V and the desired value for the field current would cause the voltage output of generator 14 to drop below 160 V (i.e. greater than 20% deviation from the demanded load), automatic voltage regulator 32 may employ a "best fit" strategy to determine the lowest field current that would maintain the output voltage of generator 14 within the acceptable range (i.e. 160 V).

Engine control module 30 may generate a request for load relief in response to desired air-fuel ratios. It should be appreciated that the desired air-fuel ratios may be determined by engine control module 30 during operation of gen-set 10, or by automatic voltage regulator (e.g. in the form of the load command). FIG. 4 presents an exemplary method for use by engine control module 30 to generate a request for load relief.

Engine control module 30 may generally monitor the operating parameters of engine 12 during operation of gen-set 10 (Step 201). For example, engine control module 30 may monitor current and desired air-fuel ratios. The air-fuel ratios may be calculated in response to mechanical loads or load commands, as described above. Although described with reference to air-fuel ratios, it is contemplated that the method of FIG. 4 may be carried out with respect to any combination of the operating parameters of engine 12, such as, for example, engine speed. It should be appreciated that an air-fuel ratio that deviates from the desired operating range of engine 12 may cause engine 12 to lug, stall, and/or operate outside of statutory regulations (e.g. emissions regulations). As such, engine control module 30 may compare the desired air-fuel ratio to a range of acceptable air-fuel ratios stored in its memory to determine whether the desired air/fuel ratio may cause engine 12 to lug, stall, and/or operate outside of one or more desired operating ranges (Step 202). If engine control module 30 determines that the desired air-fuel ratio may not cause engine 12 to lug, stall, and/or operate outside of one or more desired operating ranges, engine control module 30 may continue to monitor the current and desired engine speeds.

However, if engine control module 30 determines that the desired air-fuel ratio may cause engine 12 to lug, stall, and/or operate outside of statutory regulations, engine control module 30 may generate a request for generator load relief and deliver the request to automatic voltage regulator 32 (Step 203). More specifically, engine control module 30 may generate the request to communicate a value proportional to an amount of desired generator load relief. It should be appreciated that the request may be generated before the load on engine 12 can cause operation of engine 12 to deviate from one or more desired operating ranges. It is contemplated that the request may alternatively communicate a value proportional to a desired change in mechanical load, a desired electrical load relief, or a desired change in the electrical load. During the load relief operation, as described above, engine control module 30 may continue to determine whether desired air-fuel ratios may cause engine 12 to operate outside of one or more desired ranges (Step 204). If engine control module 30 determines that desired air-fuel ratios may cause engine 12 to operate outside of one or more desired operating ranges, it may maintain the request for load relief (Step 205). Otherwise, engine control module 30 may terminate the request for load relief (Step 206). It should be appreciated that engine control module may terminate the request for load relief, for example, by delivering a termination signal to automatic voltage regulator 32 or, alternatively, by ceasing to deliver a signal requesting load relief to automatic voltage regulator 32.

The disclosed control system may increase the overall efficiency of any engine by allowing the engine to operate a greater percent of the time within a desired operating range. Specifically, by determining a capacity for the engine to alter its operation and accept a change in loading, and relieving any excess load, the disclosed control system may minimize the likelihood of engine under or over loading. More specifically, because the disclosed control system may determine the capacity for the engine to alter its operation and accept a change in loading based on a parameter that may change substantially instantaneously when the change in loading is applied (i.e. voltage, current, and/or power factor), time delays between the change in loading and corresponding change in engine operation may be minimized. Further, by determining a field current to relieve at least a portion of the load on the engine, the disclosed control system may additionally increase the overall efficiency of any generator set by allowing the generator set to operate a greater percent of the time within a desired operating range.

Other embodiments of the disclosed control system will be apparent to those skilled in the art from consideration of the specification and practice of the system disclosed herein. It is intended that the specification and examples be considered as exemplary only, with a true scope being indicated by the following claims.

What is claimed is:
1. A control system, comprising:
an engine having a desired operating range;
a generator driven by the engine to produce an electrical power output;
an automatic voltage regulator communicatively coupled with the generator and configured to:
   monitor at least one of a voltage output, a current output, and a power factor of the generator; and
   generate a load command based on a change in at least one of the voltage output, the current output, and the power factor; and
an engine control module communicatively coupled with the engine and the automatic voltage regulator, the engine control module being configured to:
   monitor an operating parameter of the engine;
   receive the load command from the automatic voltage regulator;

determine if changing the operating parameter in response to the load command will cause the engine to deviated from the desired operating range; and request load relief to decrease a load on the engine before the load causes the engine to deviate from the desired operating range.

2. The control system of claim 1, wherein the operating parameter of the engine is at least one of a fueling parameter, and an air induction parameter.

3. The control system of claim 1, wherein:

the request for load relief is delivered to the automatic voltage regulator; and the automatic voltage regulator is further configured to reduce a voltage output of the generator based on the request for load relief.

4. The control system of claim 3, wherein the automatic voltage regulator controls a field current of the generator to reduce the voltage output.

5. The control system of claim 4, wherein the automatic voltage regulator is further configured to:

associate the request for load relief with at least one membership function;

apply a plurality of rules to the associated membership functions;

determine a plurality of results from the rules; and determine a desired value of the voltage output based on a combination of the plurality of rules.

* * * * *

UNITED STATES PATENT AND TRADEMARK OFFICE
CERTIFICATE OF CORRECTION

PATENT NO. : 8,560,201 B2  
APPLICATION NO. : 12/601499  
DATED : October 15, 2013  
INVENTOR(S) : Morrow et al.

Page 1 of 1

It is certified that error appears in the above-identified patent and that said Letters Patent is hereby corrected as shown below:

Title Page, Column 1, Item 75 (Inventors), line 6, delete "Paresh Rameschchandra Desai," and insert -- Paresh Rameshchandra Desai, --.

In the Claims,

Column 15, line 3, in Claim 1, delete "deviated" and insert -- deviate --.

Signed and Sealed this
Twenty-fifth Day of August, 2015

Michelle K. Lee
*Director of the United States Patent and Trademark Office*